(12) United States Patent
Owoeye et al.

(10) Patent No.: US 11,988,147 B2
(45) Date of Patent: May 21, 2024

(54) HEAT EXCHANGER FOR A HYDROGEN FUEL DELIVERY SYSTEM

(71) Applicant: General Electric Company, Schenectady, NY (US)

(72) Inventors: Eyitayo James Owoeye, Houston, TX (US); Constantinos Minas, Slingerlands, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/859,092

(22) Filed: Jul. 7, 2022

(65) Prior Publication Data

US 2024/0011440 A1 Jan. 11, 2024

(51) Int. Cl.
*F02C 7/224* (2006.01)
*F02C 3/22* (2006.01)
*F02C 7/22* (2006.01)

(52) U.S. Cl.
CPC .............. *F02C 7/224* (2013.01); *F02C 3/22* (2013.01); *F02C 7/222* (2013.01); *F05D 2220/323* (2013.01); *F05D 2260/207* (2013.01); *F05D 2260/213* (2013.01); *F05D 2260/22141* (2013.01)

(58) Field of Classification Search
CPC .. F02C 7/222; F02C 7/224; F02C 3/22; F05D 2220/232; F05D 2260/207; F05D 2260/213; F05D 2260/22141
See application file for complete search history.

(56) References Cited

U.S. PATENT DOCUMENTS

| 1,757,136 | A | | 5/1930 | Pabodie | |
|---|---|---|---|---|---|
| 5,215,144 | A | * | 6/1993 | May | F28D 21/0008 165/169 |
| 5,340,664 | A | | 8/1994 | Hartvigsen | |
| 6,092,590 | A | * | 7/2000 | Suttrop | F28D 7/026 165/169 |
| 6,400,896 | B1 | * | 6/2002 | Longardner | F28D 20/02 126/400 |

(Continued)

OTHER PUBLICATIONS

Airbus, How to Store Liquid Hydrogen for Zero-Emission Flight, Dec. 10, 2021, 5 Pages https://www.airbus.com/en/newsroom/news/2021-12-how-to-store-liquid-hydrogen-for-zero-emission-flight.

(Continued)

*Primary Examiner* — Craig Kim
(74) *Attorney, Agent, or Firm* — Dority & Manning, P.A.

(57) ABSTRACT

A heat exchanger for a hydrogen fuel delivery system includes a tube bank including an inner-tube where a first portion of the inner-tube extends through an inlet region of the tube bank, a second portion of the inner-tube extends through a mid-region of the tube bank, and a third portion of the inner-tube extends through an outlet region of the tube bank. A thermal buffer at least partially surrounds the inner-tube. A first portion of the thermal buffer extends along the first portion of the inner-tube, a second portion of the thermal buffer extends along the second portion of the inner-tube, and a third portion of the thermal buffer extends along the third portion of the inner-tube. A plurality of fins is disposed along the inner-tube and extends radially outwardly from an outer surface of the thermal buffer.

17 Claims, 11 Drawing Sheets

(56) References Cited

U.S. PATENT DOCUMENTS

| | | | | |
|---|---|---|---|---|
| 7,284,394 | B2* | 10/2007 | Heyl | F25B 43/006 |
| | | | | 62/503 |
| 8,180,207 | B2 | 5/2012 | Shirai et al. | |
| 9,130,204 | B2 | 9/2015 | Hoffjann et al. | |
| 10,182,513 | B2* | 1/2019 | Quinn | F28D 20/021 |
| 2007/0227160 | A1* | 10/2007 | Johnson | F28D 20/02 |
| | | | | 165/96 |
| 2015/0266144 | A1 | 9/2015 | Bengaouer et al. | |
| 2019/0381451 | A1 | 12/2019 | Piesker | |
| 2021/0102492 | A1* | 4/2021 | Rambo | F02C 3/22 |
| 2022/0364802 | A1* | 11/2022 | Staubach | F02C 7/14 |

OTHER PUBLICATIONS

Reuters, Airbus May Make Engines for Hydrogen Fuelled Planes, CEO Tells Paper, Aerospace & Defense, Feb. 4, 2022, 10 p. https://www.reuters.com/business/aerospace-defense/airbus-may-make-engines-hydrogen-fuelled-planes-ceo-tells-paper-2022-02-04/.

* cited by examiner

HEAT EXCHANGER FOR A HYDROGEN FUEL DELIVERY SYSTEM

FIELD

The present disclosure relates to a hydrogen fuel delivery system.

BACKGROUND

A propulsion system for commercial aircraft typically includes one or more aircraft engines, such as turbofan jet engines. Certain aircraft engines burn hydrogen fuel in a gaseous state. H2 hydrogen is stored aboard the aircraft at extremely cold temperatures (e.g., 14-30 Kelvin) and generally may be heated to a gaseous state prior to being combusted by the aircraft engines.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Figure 1:
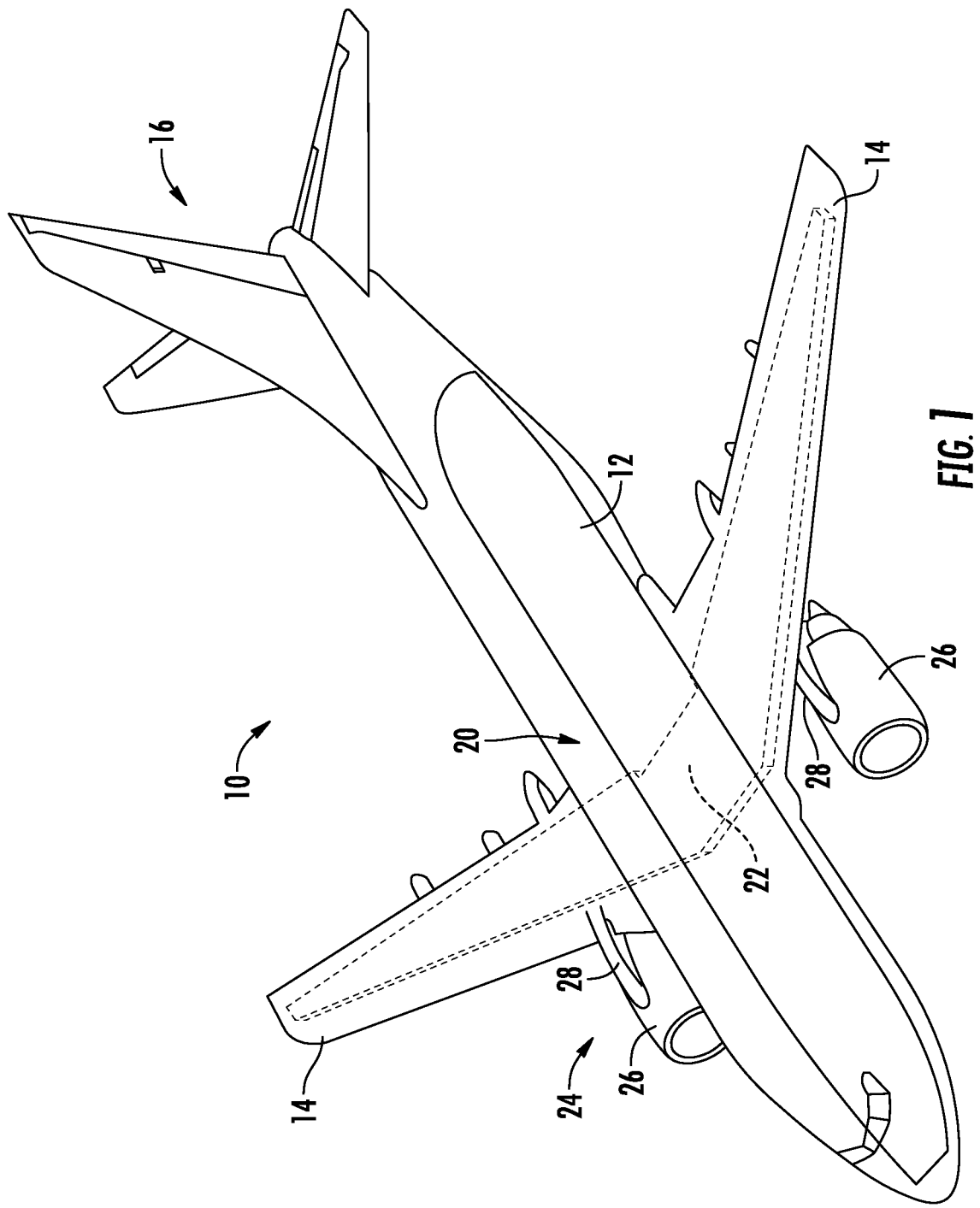
FIG. 1 is a schematic view of an aircraft having a fuel system in accordance with an exemplary embodiment of the present disclosure.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components. Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary. The singular forms "a", "an", and "the" include plural references unless the context clearly dictates otherwise. The term "at least one of" in the context of, e.g., "at least one of A, B, and C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output. The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

The present disclosure is generally related to a compact heat exchanger with anti-icing capability. Hydrogen fuel, whether in an H2, gas or supercritical state is relatively cold with respect to atmospheric and engine working fluid temperatures. A concern with heat exchangers used to warm H2 hydrogen is the tendency of structural integrity loss and reduced thermal performance due to water and air freezing at the outer surface, particularly an inlet region of the heat exchanger. Also, since H2 hydrogen is highly combustible, the number of connection points should be minimized to prevent or reduce the likelihood of hydrogen leakage. To ensure sufficient heat transfer surface area however, these requirements would make the H2 exchanger very bulky and heavy, which is not ideal for an aircraft application.

The present disclosure provides a compact heat exchanger with anti-freezing capability of a heating medium using heat transfer fins and a thermal buffer that is disposed around each tube of a tube bank. To ensure zero connection points that may result in H2 leakage, the heat exchanger is made up of one or more single-run or continuous inner-tubes that efficiently meander within a shell of the exchanger to form multiple generally parallel tube rows with multiple tubes per row to form a tube bank. The tube rows can be arranged in triangular or rectangular formation. Each tube, which receives the H2, is directly connected to a H2-side inlet and to an outlet of the heat exchanger.

In certain embodiments the thermal buffer can be a consistent material along the inner-tube(s) with varied thermal buffer material thickness. The thickness of the thermal buffer may be adjusted along the run of the inner-tube based on the needed thermal gradient at each region of the tube bank. The thickness of the thermal buffer is highest at the H2 inlet region of the tube bank and smallest at the outlet region, whereas the fin height (fin surface area exposed) is smallest at the H2 inlet region and highest at the outlet region. The fin outer diameter is constant throughout the tube length.

In the alternative, the thermal buffer may have a constant thickness but varied materials along the tube run with different thermal conductivities. When the thermal buffer uses different materials, the buffer region is arranged such that the lowest thermal conductivity material is used at the H2 inlet region, and the highest thermal conductivity material is used at the outlet region. The same buffer thickness, fin height, and fin outer diameter are maintained across the inner-tube of the tube rows in the heat exchanger.

In other configurations, the thermal buffer may include or contain a phase change material (PCM) which is sealed in place (static). When the PCM is sealed-in-place, the thermal buffer thickness and fin height is varied across the entire tube length. The thickness of the thermal buffer is highest at the H2 inlet region and smallest at the outlet, whereas the fin height is smallest at the H2 inlet and highest at the outlet. Multiple internal tube supports connect the inner and outer-tube to ensure structural integrity of the tube bank.

In other configurations, the thermal buffer may include or contain a PCM/other tertiary fluid that is continuously recirculated via an external pump and heated via a heat-source from the engine. When the tertiary fluid/PCM is recirculated, a constant thermal buffer thickness and fin height is maintained across the tube rows from H2 inlet region to the outlet region. This minimizes pressure drop of the thermal buffer fluid.

With a recirculated tertiary fluid/PCM, multiple internal tube supports also connect the inner and outer-tube to ensure structural integrity. In this configuration, the heat exchanger performs as a three-fluid heat exchanger with the recirculated tertiary fluid/PCM acting as the third-side fluid. The flowrate of the tertiary fluid/PCM can be throttled to manage changes in the H2 flowrate to maintain sufficient thermal gradient across different sections of the tube channel. Alternatively, another heat exchanger can be added on a bypass to manage changes in H2 flowrate.

Referring now to the drawings, FIG. 1 is a perspective view of an exemplary aircraft 10 that may incorporate at least one exemplary embodiment of the present disclosure. As shown in FIG. 1, the aircraft 10 has a fuselage 12, wings 14 attached to the fuselage 12, and an empennage 16. The aircraft 10 further includes a fuel delivery system 20 having a H2 hydrogen fuel tank 22 for holding a hydrogen fuel in a H2 phase. In the exemplary aircraft 10 shown in FIG. 1, at least a portion of the H2 hydrogen fuel tank 22 is held in a wing 14 of the aircraft 10. In some embodiments, however, the H2 hydrogen fuel tank 22 may be located at other suitable locations in the fuselage 12 or the wing 14. It will be appreciated that the H2 hydrogen fuel is stored in the H2 hydrogen fuel tank 22 at a relatively low temperature. For example, the first portion of hydrogen fuel may be stored in the H2 hydrogen fuel tank 22 at about −253 Deg. Celsius or less at an atmospheric pressure, or at other temperatures and pressures to maintain the hydrogen fuel substantially in the H2 phase.

As shown in FIG. 1, the aircraft 10 further includes a propulsion system 24 that produces a propulsive thrust required to propel the aircraft 10 in flight, during taxiing operations, etc. Although the propulsion system 24 is shown attached to the wing(s) 14, in other embodiments it may additionally or alternatively include one or more aspects coupled to other parts of the aircraft 10, such as, for example, the empennage 16, the fuselage 12, or both. The propulsion system 24 includes at least one engine. In the exemplary embodiment shown, the aircraft 10 includes a pair of engines with each engine being configured as a gas turbine engine 26. Each gas turbine engine 26 is mounted to the aircraft 10 in an under-wing configuration through a respective pylon 28. Each gas turbine engine 26 is capable of selectively generating a propulsive thrust for the aircraft 10.

Figure 2:
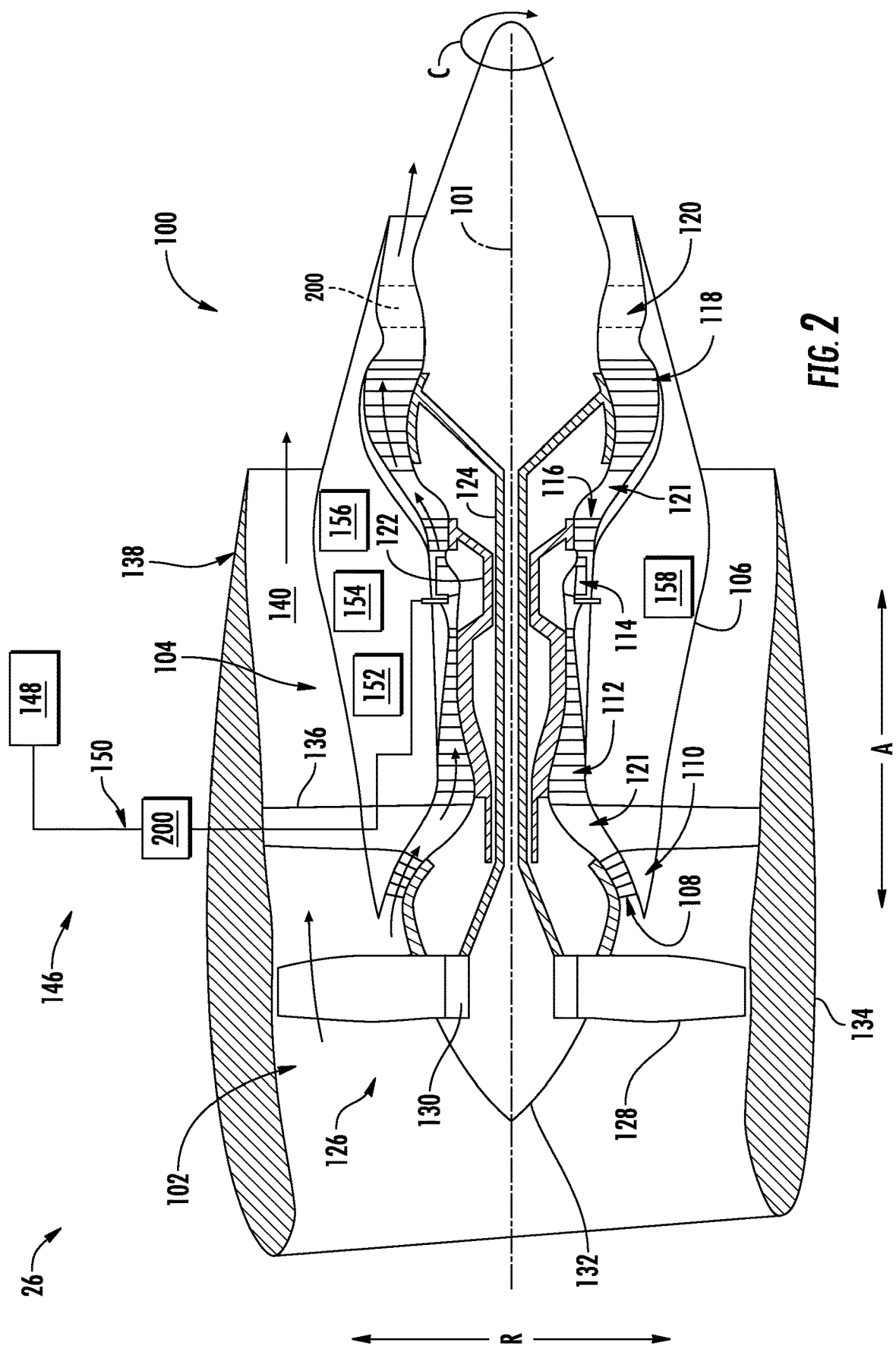
FIG. 2 is a schematic, cross-sectional view of a gas turbine engine in accordance with an exemplary embodiment of the present disclosure.

FIG. 2 is a schematic, cross-sectional view of an exemplary gas turbine engine in accordance with an exemplary embodiment of the present disclosure. As shown in FIG. 2, the gas turbine engine 26 is configured as a high bypass turbofan engine 100 herein referred to as engine 100. The engine 100 defines an axial direction A (extending parallel to a longitudinal centerline 101 provided for reference), a radial direction R, and a circumferential direction C extending about the axial direction A. In general, the engine 100 includes a fan section 102 and a turbomachine 104 disposed downstream from the fan section 102.

The turbomachine 104 depicted generally includes an outer casing 106 that defines an annular inlet 108. The outer casing 106 encases, in serial flow relationship, a compressor section including a booster or low-pressure (LP) compressor 110, a high-pressure (HP) compressor 112, a combustion section 114, a turbine section including a high-pressure (HP) turbine 116 and a low-pressure (LP) turbine 118, and a jet exhaust section 120. The compressor section, combustion section 114, and turbine section together define at least in part a core air flow-path 121 extending from the annular inlet 108 to the jet exhaust section 120. The engine 100 further includes a high-pressure (HP) shaft 122 drivingly connecting the HP turbine 116 to the HP compressor 112, and a low-pressure (LP) shaft 124 drivingly connecting the LP turbine 118 to the LP compressor 110. The LP compressor 110, the LP turbine 118, and the LP shaft 124 at least partially makeup a low-pressure spool of the turbomachine 104. The HP compressor 112, the HP turbine 116, and the HP shaft 122 at least partially make up a high-pressure spool of the turbomachine 104.

The fan section 102 includes a fan 126 having a plurality of fan blades 128 coupled to a disk 130. The fan blades 128 and disk 130 are together rotatable about the longitudinal centerline 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially spaced outlet guide vanes 136. A downstream section 138 of the nacelle 134 extends over an outer portion of the turbomachine 104 to define a bypass airflow passage 140 therebetween.

Referring still to FIG. 2, the engine 100 is operable with a fuel system 146 for receiving a flow of gaseous hydrogen fuel (GH2) from the fuel system 146. The fuel system 146 may be configured similarly to the fuel delivery system 20 of FIG. 1. Accordingly, the fuel system 146 generally includes a H2 hydrogen fuel tank 148, and a fuel delivery assembly 150. The fuel delivery assembly 150 provides a fuel flow from the H2 hydrogen fuel tank 148 to the engine 100, and more specifically to a fuel manifold (not labeled) of the combustion section 114 of the turbomachine 104.

Moreover, as is depicted schematically, the engine 100 further includes various accessory systems to aid in the operation of the engine 100. For example, the engine 100 includes a main lubrication system 152 configured to provide a lubricant to various bearings and gear meshes in the compressor section, the turbine section, the HP shaft 122, the LP shaft 124, etc. The lubricant provided by the main lubrication system 152 may increase the useful life of such components and may remove a certain amount of heat from such components.

Additionally, the engine 100 includes a compressor cooling air (CCA) system 154 for providing air from one or both of the HP compressor 112 or (LP) compressor 110 to one or both of the HP turbine 116 or (LP) turbine 118. Moreover, the engine 100 includes an active thermal clearance control (ACC) system 156 for cooling a casing of the turbine section to maintain a clearance between the various turbine rotor blades and the turbine casing within a desired range throughout various engine operating conditions. Furthermore, the engine 100 includes a generator lubrication system 158 for providing lubrication to an electronic generator (not shown), as well as cooling/heat removal for the electronic generator. The electronic generator may provide electrical power to various systems including a startup electric motor for the engine 100 and/or various other electronic components of the engine 100 and/or the aircraft 10. Heat from these accessory systems 152, 154, 156, 158, and other accessory systems may be provided as a hot-side fluid to various heat sinks/heat exchangers (as discussed below) during operation.

It will be appreciated that the engine 100 depicted in FIG. 2 is provided by way of example only. In other exemplary embodiments, any other suitable engine may be utilized with aspects of the present disclosure. For example, in other embodiments, the engine 100 may be any other suitable gas turbine engine, such as a turboshaft engine, turboprop engine, turbojet engine, etc. It will further be appreciated that in other embodiments the gas turbine engine 26 (FIG. 1) may have any other suitable configuration, such as any other suitable number or arrangement of shafts, compressors, turbines, fans, etc.

Further, although the exemplary gas turbine engine depicted in FIG. 2 is shown schematically as a direct drive, fixed-pitch turbofan engine, in other embodiments, a gas turbine engine of the present disclosure may be a geared gas turbine engine (i.e., including a gearbox between the fan 126 and a shaft driving the fan 126, such as the LP shaft 124), may be a variable pitch gas turbine engine (i.e., including a fan 126 having a plurality of fan blades 128 rotatable about their respective pitch axes), etc. Further, still, in alternative embodiments, aspects of the present disclosure may be incorporated into, or otherwise utilized with, any other type of engine, such as reciprocating engines. Additionally, in still other exemplary embodiments, the engine 100 may include or be operably connected to any other suitable accessory systems. Additionally, or alternatively, the engine 100 may not include or be operably connected to one or more of the accessory systems 152, 154, 156, 158 discussed above.

Figure 3:
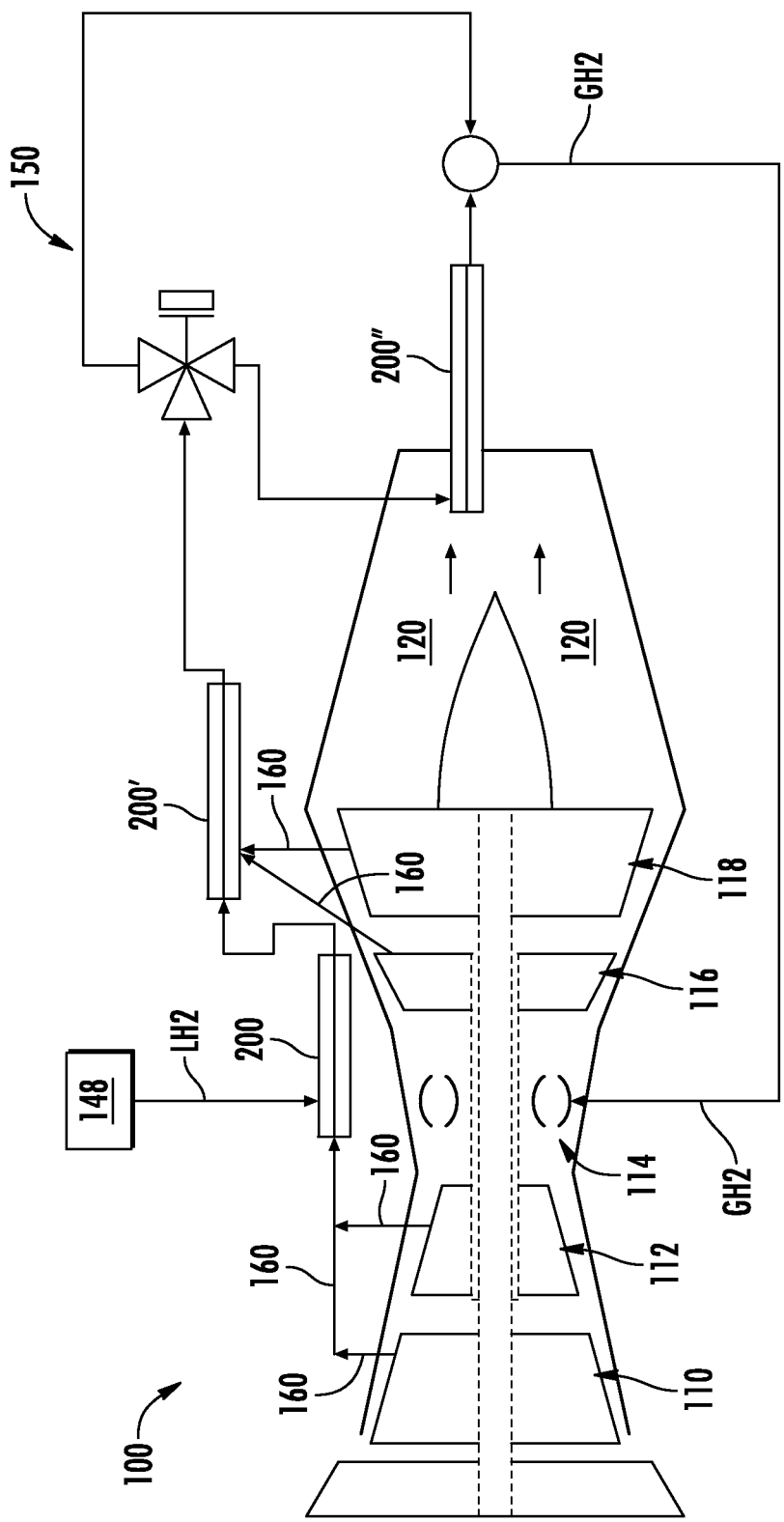
FIG. 3 is a schematic view of an exemplary gas turbine engine in accordance with an exemplary embodiment of the present disclosure.

FIG. 3 is a schematic view of an exemplary gas turbine engine in accordance with an exemplary embodiment of the present disclosure. As shown in FIG. 3, the engine 100 further includes one or more heat exchangers 200. Although three heat exchangers 200, 200', 200" are shown in FIG. 3, the engine 100 may contain more-or-less heat exchangers 200 positioned at various other locations as required for a particular engine configuration. In various embodiments, the heat exchanger(s) 200 may be fluidly coupled to and/or in fluid communication with one or more of the LP compressor 110, the HP compressor 112, the HP turbine 116, the LP turbine 118, and the jet exhaust section 120 for extracting waste heat from a respective airflow or fluid flow therefrom, such that waste heat may be utilized as a hot-side fluid (HSF) 160 in a respective heat exchanger 200 to add heat to (H2) hydrogen flowing from the hydrogen fuel tank 148, thereby transitioning or assisting the transition of the hydrogen to a gaseous hydrogen (GH2) for combustion in the combustion section 114.

Figure 4:
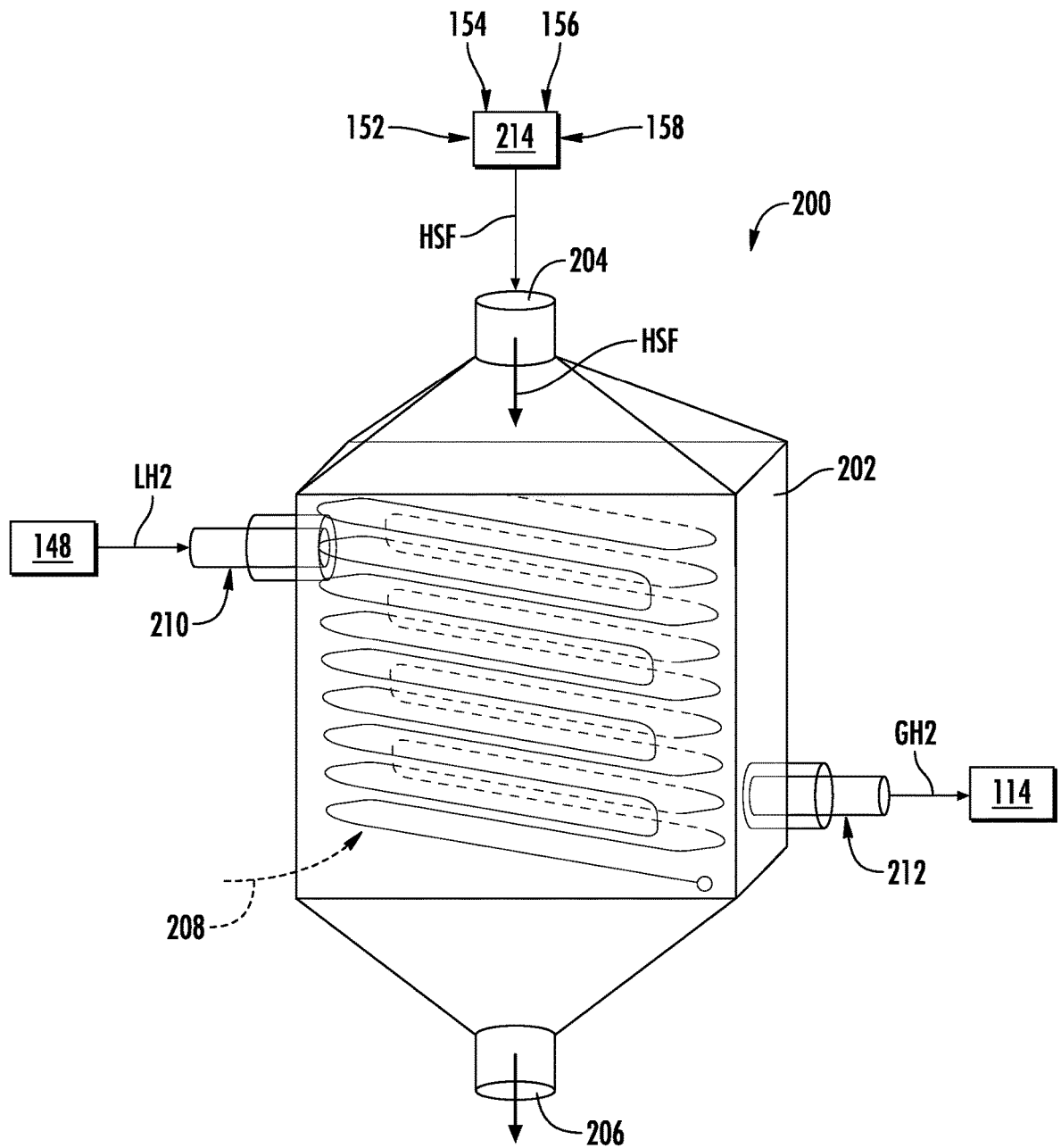
FIG. 4 is a perspective view of an exemplary heat exchanger according to an exemplary embodiment of the present disclosure.

FIG. 4 provides a perspective view of an exemplary heat exchanger 200 according to an exemplary embodiment of the present disclosure. As shown in FIG. 4, the heat exchanger 200 includes a casing or shell 202 including a shell inlet 204 and a shell outlet 206. A tube bank 208 is disposed within the shell 202. The tube bank 208 includes an inner-tube inlet 210 and an inner-tube outlet 212. The shell inlet 204 is fluidly coupled to a heat source 214 for receiving a hot-side fluid (HSF) into the shell 202.

In exemplary embodiments, the heat source 214 may include one or more of the main lubrication system 152, compressor cooling air (CCA) system 154, thermal clearance control (ACC) system 156, and the generator lubrication system 158 as discussed above. In exemplary embodiments, the heat source 214 includes the turbine section or jet exhaust section 120. The inner-tube inlet 210 is fluidly coupled to the hydrogen fuel tank 148 for receiving a flow of hydrogen (H2). The tube outlet 212 is fluidly coupled to the combustion section 114 for providing a flow of gaseous hydrogen (GH2) for combustion therein.

Figure 5:
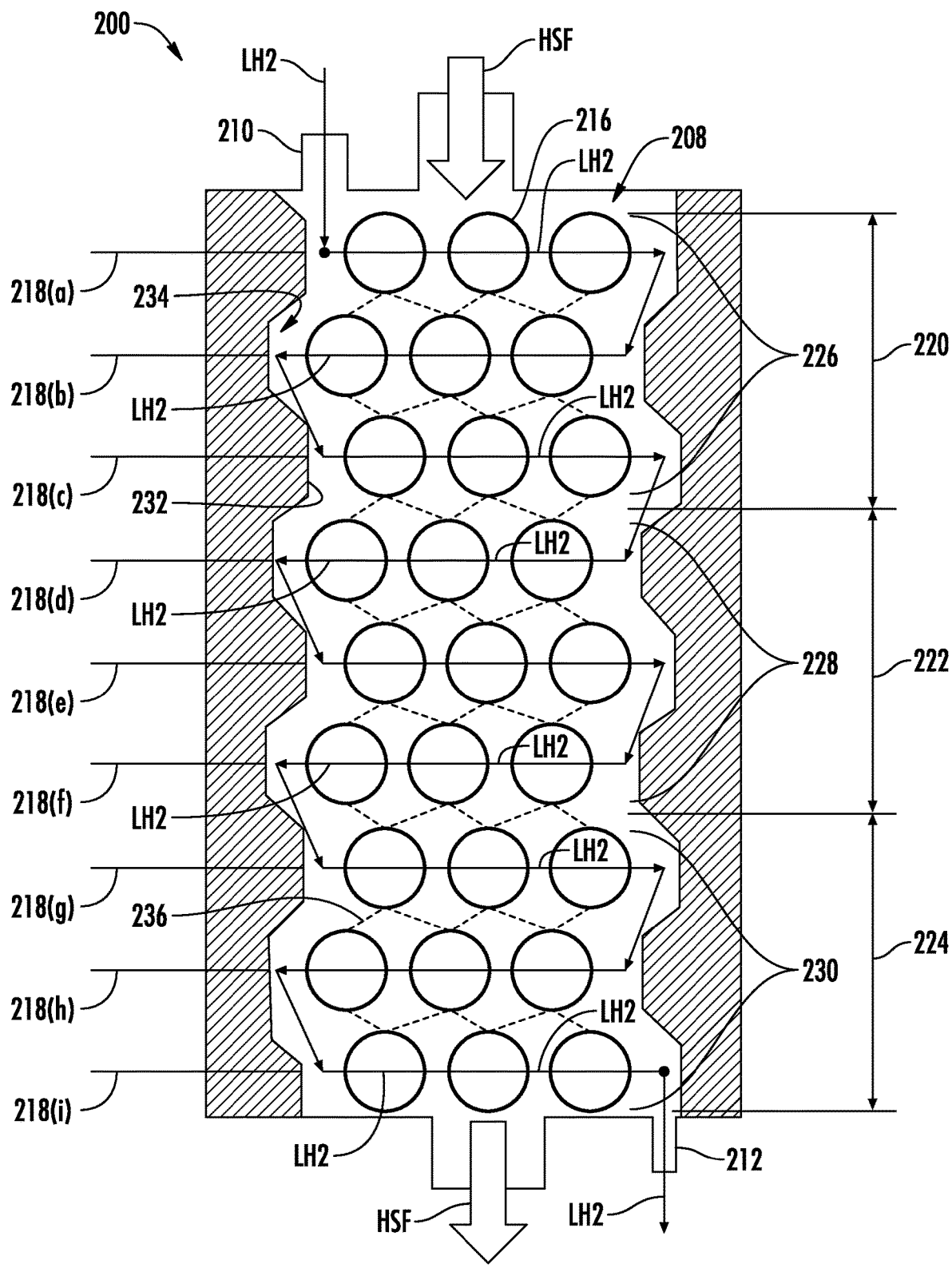
FIG. 5 is a cross-sectional side view of the exemplary heat exchanger shown in FIG. 4, according to an exemplary embodiment of the present disclosure.

FIG. 5 provides a cross-sectional side view of the exemplary heat exchanger 200 shown in FIG. 4, according to an exemplary embodiment of the present disclosure. As shown in FIG. 5, the tube bank 208 includes one or more inner-tubes 216 formed/bent into multiple parallel rows 218(*a-i*). Each inner-tube 216 is fluidly coupled directly to the inner-tube inlet 210 and the inner-tube outlet 212 shown in FIG. 4, and each inner-tube 216 is formed as a single/continuous tube.

It shall be appreciated that although the exemplary tube bank 208 shown in FIG. 5 illustrates an inner-tube 216 formed/bent into nine rows 218(*a-i*), the tube bank 208 may include more-or-less inner-tubes 216 per row formed in more-or-less rows as required for a particular application. In the exemplary embodiment, the inner-tube 216 of the tube bank 208 is formed as single/continuous tube, meaning that the particular inner-tube 216 does not have any joints. The jointless inner-tube 216, along with a zero inlet and outlet manifold, reduces the number of potential hydrogen leaks due to failed or faulty tube joints. In various embodiments, the tube rows 218(a-i) can be arranged in triangular or rectangular formations to maximize heat transfer and/or minimize pressure drop of the hot fluid stream.

As further shown in FIG. 5, the tube bank 208 is divided into thermal gradient regions including an inlet region 220, an intermediate or mid-region 222, and an outlet region 224. The inlet region 220 is disposed at or proximate to the shell inlet 204 of the heat exchanger 200. The outlet region 224 is disposed at or proximate to the shell outlet 206 of the heat exchanger 200. The mid-region 222 is defined/disposed downstream from the inlet region 220 and upstream from the outlet region 224 with respect to hydrogen flow H2 through the respective inner-tube 216. A first portion 226 of the inner-tube 216 extends through/is disposed within the inlet region 220, a second portion 228 of the inner-tube 216 extends through/is disposed in the mid-region 222, and a third portion 230 of the inner-tube 216 extends through/is disposed in the outlet region 224 of the tube bank 208.

As further shown in FIG. 5, the H2 flow direction, indicated via arrows H2, runs from the tube inlet 210 to the tube outlet 212 in the heat exchanger 200. As shown, the hot-side fluid (HSF) is in co-flow direction with the H2 flow direction such that the hottest section of the HSF first encounters the coldest H2 region (inlet region 220) to prevent freezing around the inner-tube inlet 210 region. Nonetheless, the HSF flows in perpendicular/crossflow direction to the tube rows 218 and spacing between the tube rows and number of rows is varied to minimize pressure drop.

In an exemplary embodiment, since fluid flows through the path of least resistance, an inner wall 232 of the shell 202 of the heat exchanger 200 contains/defines grooves 234 that conform with the arrangement of the tube rows 218. This maximizes HSF interaction with the inner-tube 216 at each tube row 218(a-i) within each of the inlet region 220, mid-region 222, and the outlet region 224 to enable higher heat transfer. Without the inner shell wall grooves 234, a higher fraction of the HSF flow will bypass the tube rows 218(a-i) and instead flow along the inner wall 232, thereby reducing overall efficiency of the heat exchanger 200. A plurality of external tube supports 236 interconnect the tube rows 218 and connect the tube bank 208 with the shell inner wall 232 to ensure structural integrity and prevent tube vibration.

Figure 6:
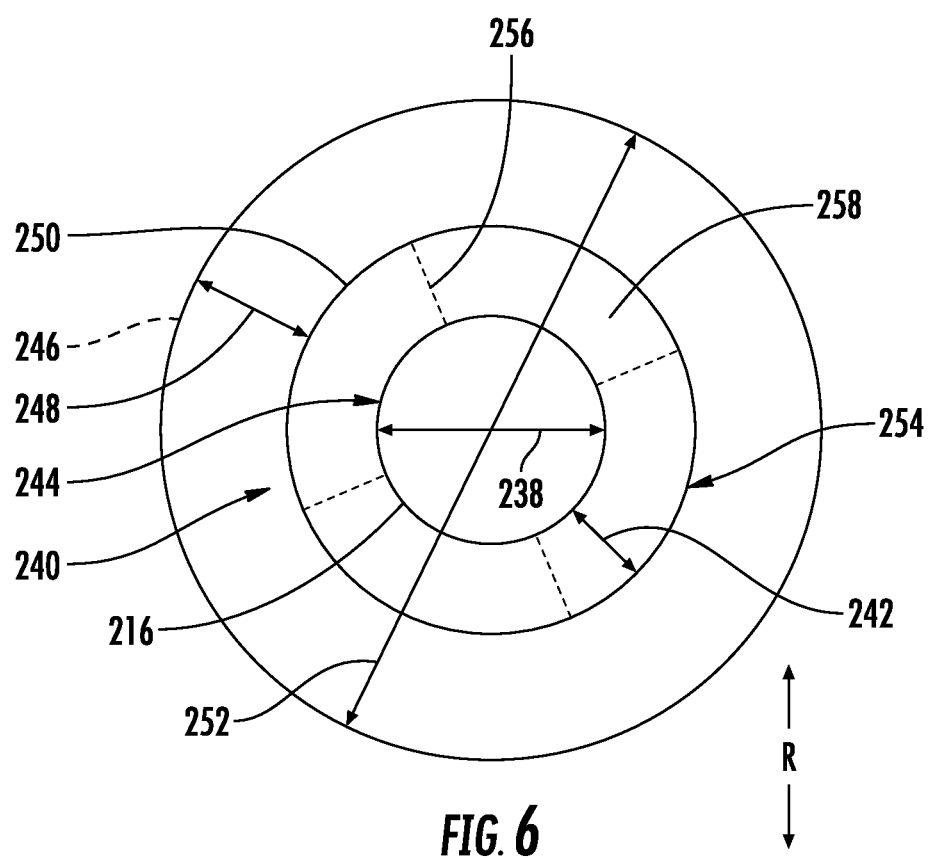
FIG. 6 is a cross-sectional view of a portion of an exemplary inner-tube of an exemplary tube bank according to an exemplary embodiment of the present disclosure.

FIG. 6 provides a cross-sectional view of a portion of an exemplary inner-tube 216 of the tube bank 208 as shown in FIGS. 4 and 5, according to various embodiments of the present disclosure. As shown in FIG. 6, the inner-tube 216 has an inner-tube diameter 238. A thermal insulator or buffer 240 surrounds/encases the inner-tube 216. In exemplary embodiments, the thermal buffer 240 has a thermal buffer thickness 242 that is measured radially outwardly from an outer surface 244 of the inner-tube 216. A heat transfer element such as a fin 246 extends radially outwardly from and at least partially circumferentially around the outer surface 244 of the inner-tube 216. A fin height 248 is measured radially outwardly from an outer surface 250 of the thermal buffer 240 in the radial direction R. Each fin 246 has an outer diameter 252.

In exemplary embodiments, as further shown in FIG. 6, the thermal buffer 240 includes an outer-tube 254 that is radially spaced from the inner-tube 216. A plurality of internal tube supports 256 connect the inner-tube 216 to the outer-tube 254, in certain embodiments. The outer-tube 254 may be used to contain/encase a thermal buffer material 258, as discussed in detail below, of the thermal buffer 240.

Figure 7:
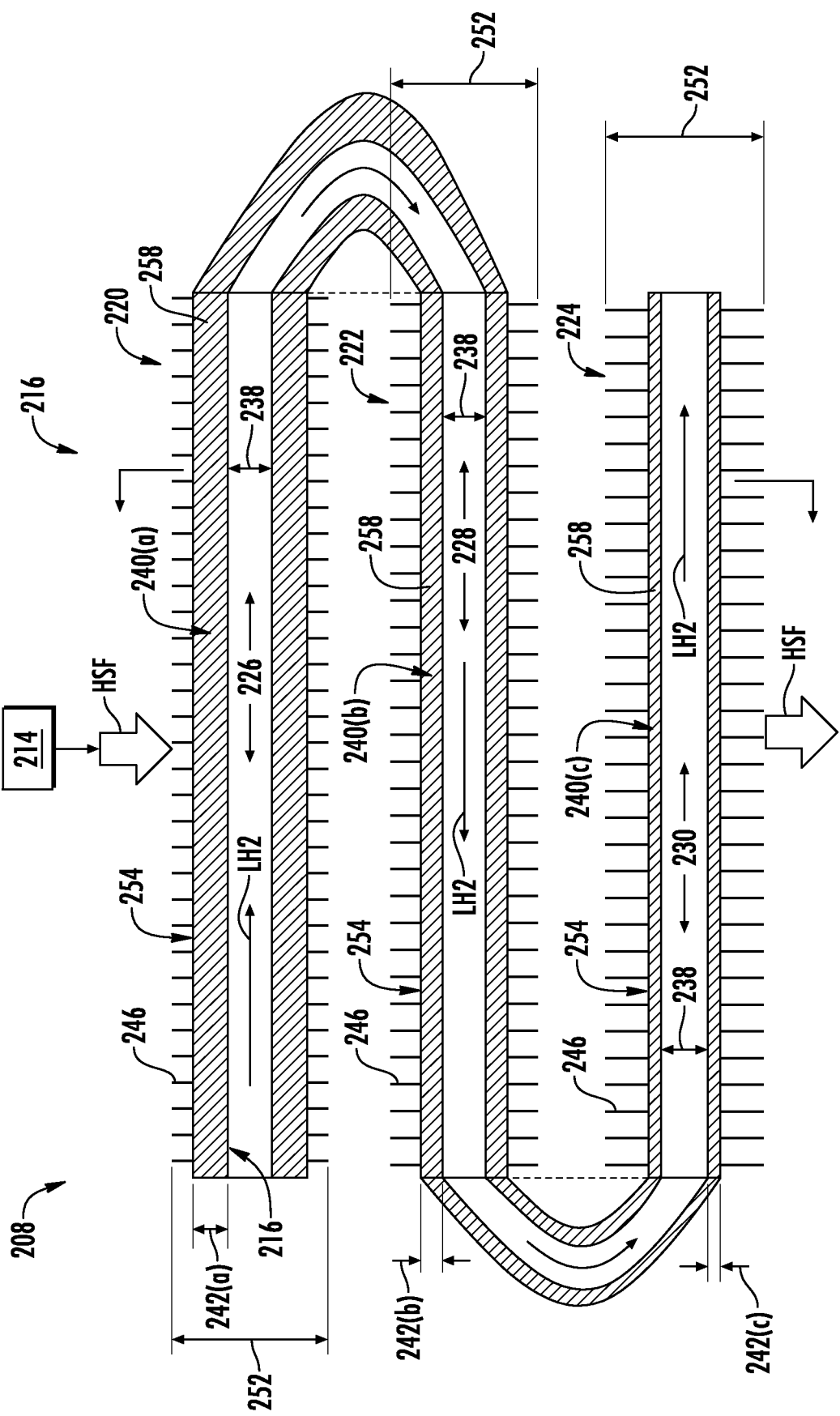
FIG. 7 is a cross-sectional schematic view of an exemplary inner-tube of an exemplary tube bank according to at least one embodiment of the present disclosure.
Figure 8:
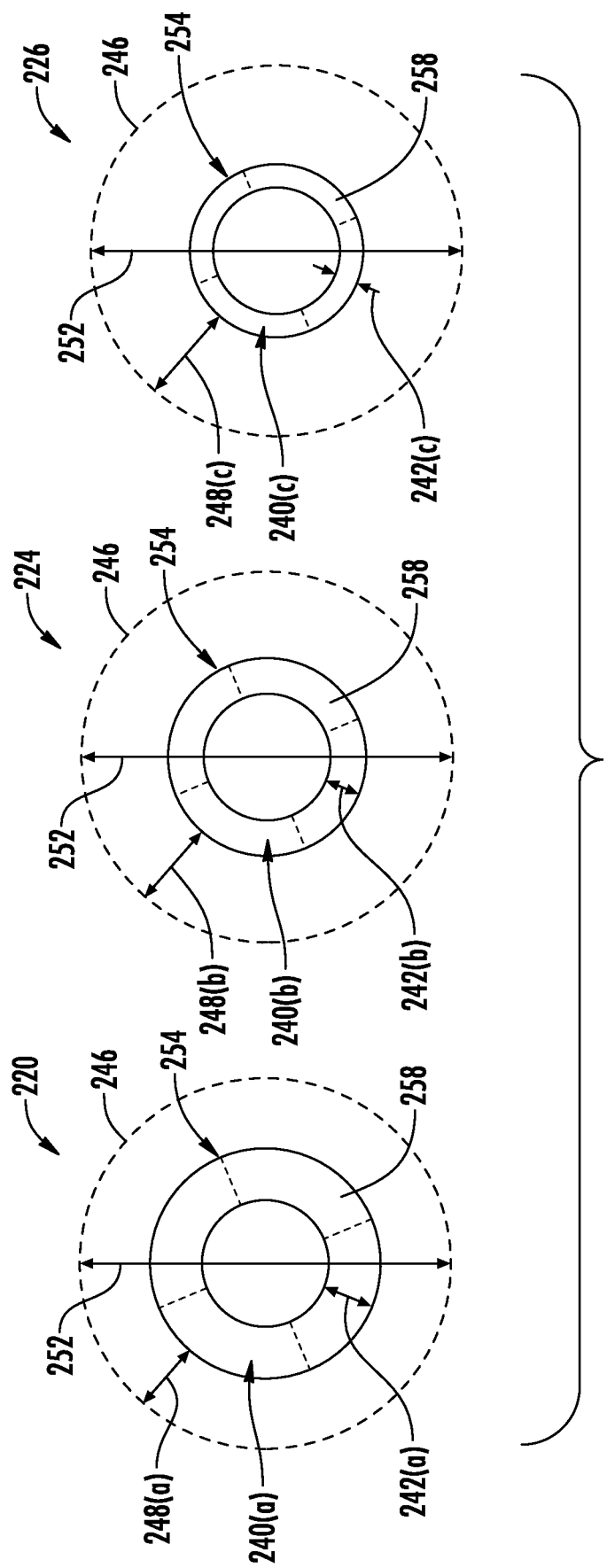
FIG. 8 is a cross-sectioned schematic view of the exemplary tube bank shown in FIG. 7, according to at least one embodiment of the present disclosure.

FIG. 7 provides a cross-sectional schematic view of an exemplary inner-tube 216 of the tube bank 208 according to at least one embodiment of the present disclosure. As shown in FIGS. 7 and 8 collectively, a first portion 240(a) of the thermal buffer 240 extends along the first portion 226 of the inner-tube 216 through the inlet region 220, a second portion 240(b) of the thermal buffer 240 extends along the second portion 228 of the inner-tube 216 through the mid region 222, and a third portion 240(c) of the thermal buffer 240 extends along the third portion 230 of the inner-tube 216 through the outlet region 224. As shown in FIGS. 7 and 8 collectively, the inner-tube 216 of the tube bank 208 has a constant inner diameter 238 from the inlet region 220, through the mid-region 222 and the outlet region 224.

In exemplary embodiments, the thermal buffer 240 has a varying thermal buffer thickness 242. The thickness of the thermal buffer 240 is adjusted based on the needed thermal gradient at each region 220, 222, 224 of the tube bank 208. In the exemplary embodiment shown, the thermal buffer 240 has a first thermal buffer thickness 242(a) along the inlet region 220, a second thermal buffer thickness 242(b) along the mid-region 222, and a third thermal buffer thickness 242(c) along the outlet region 224. As shown, the first thermal buffer thickness 242(a) is greater than the second thermal buffer thickness 242(b), and the second thermal buffer thickness 242(b) is greater than the third thermal buffer thickness 242(c).

As further shown in FIGS. 7 and 8 collectively, a plurality of fins 246 is disposed along the inner-tube 216 at each of the inlet region 220, the mid-region 222 and the outlet region 224 of the respective inner-tube 216 of the tube bank 208. As shown in FIGS. 7 and 8 collectively, each fin 246 of the plurality of fins 246 has the same or substantially the same outer diameter 252. However, as shown in FIGS. 7 and 8, the fin height 248 varies between the inlet region 220, the mid-region 222 and the outlet region 224 due to the varying thermal buffer thickness 242(a), 242(b), 242(c). As such, the respective fins 246 of the plurality of fins 246 at the inlet region 220 has a first fin height 248(a), the respective fins 246 of the plurality of fins 246 at the mid-region 222 has a second fin height 248(b), and the respective fins 246 of the plurality of fins 246 at the outlet region 224 has a third fin height 248(c).

When the thermal buffer thickness 242 is varied, the fin height 248(c) along the outlet region 224 is greater than fin height 248(b) along the mid-region 222. Fin height 248(b) is greater than fin height 248(a) along the inlet region 220. Greater or larger fin height 248 equates to a larger fin surface area for greater heat transfer between the H2 hydrogen H2 and/or gaseous hydrogen GH2 flowing through the tube(s) 216 and a relatively hot fluid stream HFS flowing from the heat source 214.

In exemplary embodiments, the thermal buffer material 258 may formed of metallic or ceramic materials. For example, the thermal buffer material 258 may include but is not limited to unless otherwise specified, metallic materials such stainless steel, copper, aluminum, brass, Inconel, carbon steel, etc., and/or ceramic materials such as silicon carbide, beryllium oxide, aluminum nitride, yttrium oxide, etc.

In other embodiments, the thermal buffer material 258 may be formed from a sealed-in-place phase change material (PCM). For example, the sealed-in-place phase change material (PCM) may include but is not limited to, unless otherwise specified, any of the following: glycerin, paraffin wax, water, sodium acetate trihydrate, etc. As shown in FIGS. 6, 7, and 8 collectively, the sealed-in-place PCM may be encased in the outer-tube 254 that is at least partially encasing inner-tube 216. As shown in FIG. 7, the outer-tube 254 extends along the inner-tube 216 from the tube inlet 210 at an upstream end of the inlet region 220, across the mid-region 222 and terminates at the tube outlet 212 downstream from the outlet region 224. As further shown in FIG. 6, multiple internal tube supports 256 connect the inner-tube 216 and outer-tube 254 to ensure structural integrity.

Figure 9:
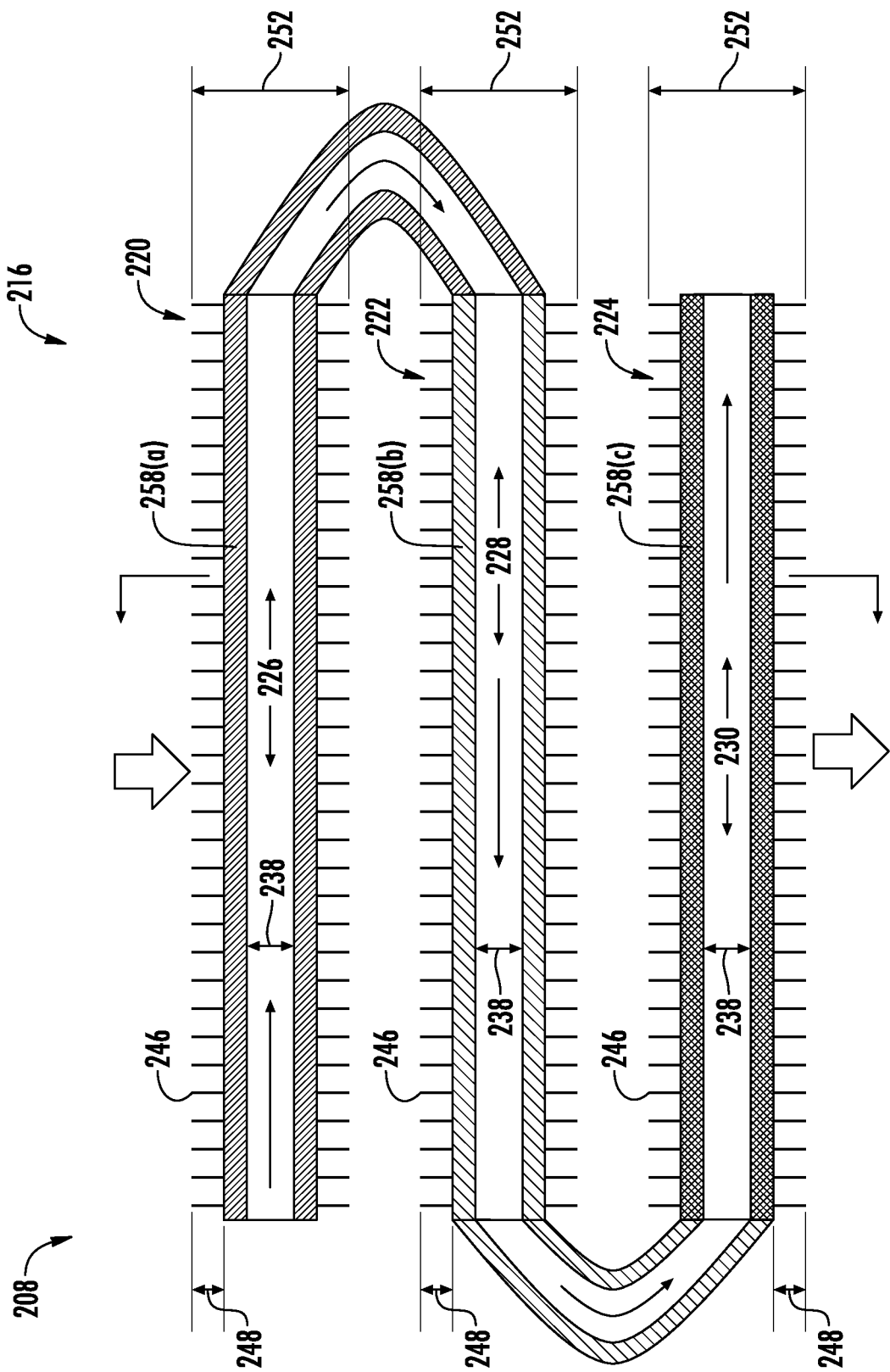
FIG. 9 is a cross-sectional schematic view of an exemplary inner-tube of an exemplary tube bank according to at least one embodiment of the present disclosure.
Figure 10:
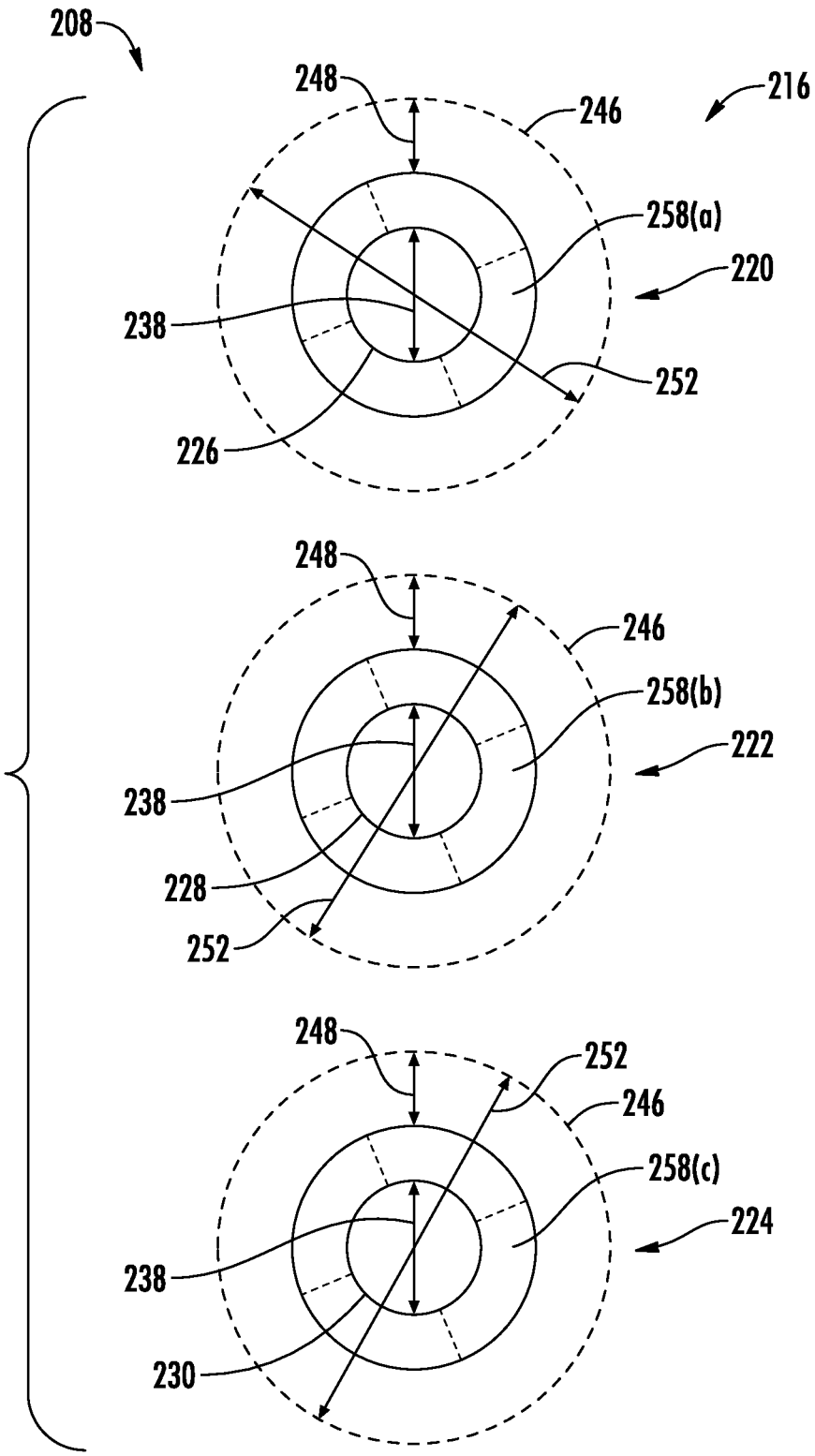
FIG. 10 is a cross-sectioned schematic view of the exemplary tube bank shown in FIG. 9, according to at least one embodiment of the present disclosure.

FIG. 9 provides a cross-sectional schematic view of an exemplary inner-tube 216 of the tube bank 208 according to at least one embodiment of the present disclosure. FIG. 10 provides cross-sectioned view of the inner-tube 216 shown in FIG. 9. As shown in FIGS. 9 and 10 collectively, the inner-tube 216 of the tube bank 208 has a constant inner diameter 238 from the first portion 226 of the inner-tube 216 through the inlet region 220, through the second portion 228 of the inner-tube 216 within the mid region 222, and through the third portion 230 of the inner-tube 216 disposed within the outlet region 224. The thermal buffer 240 has a constant or substantially constant (allowing for tolerance variation) thermal buffer thickness 242 from the inlet region 220, across the mid region 222 and the outlet region 224. A plurality of fins 246 is disposed along each of the inlet region 220, the mid region 222 and the outlet region 224 of the respective inner-tube 216 of the tube bank 208.

In the exemplary embodiment shown in FIGS. 9 and 10, the thermal buffer 240 is formed from a first thermal buffer material 258(a) that is disposed along the first portion 226 of the inner-tube 216 at the inlet region 220, a second thermal buffer material 258(b) that is disposed along second portion 228 of the inner-tube 216 within the mid-region 222, and a third thermal buffer material 258(c) that is disposed along the third portion 230 of the inner-tube 216 within the outlet region 224 of the tube bank 208. Each of the first, second and third thermal buffer materials 258(a-c) respectively, have different thermal conductivity ratings.

In certain embodiments, the first thermal buffer material 258(a) has the lowest thermal conductivity rating, the second thermal buffer material 258(b) has a relatively higher thermal conductivity as compared to the first thermal buffer material 258(a), and the third thermal buffer material 258(c) has the highest thermal conductivity rating as compared to the first and second thermal buffer materials 258(a) and 258(b) respectfully. A constant fin height 248 and a constant fin outer diameter 252 is maintained across each of the inlet region 220, the mid-region 222 and the outlet region 224 of the respective first portion 226, second portion 228 and the third portion 230 of the inner-tube 216 of the tube bank 208.

Figure 11:
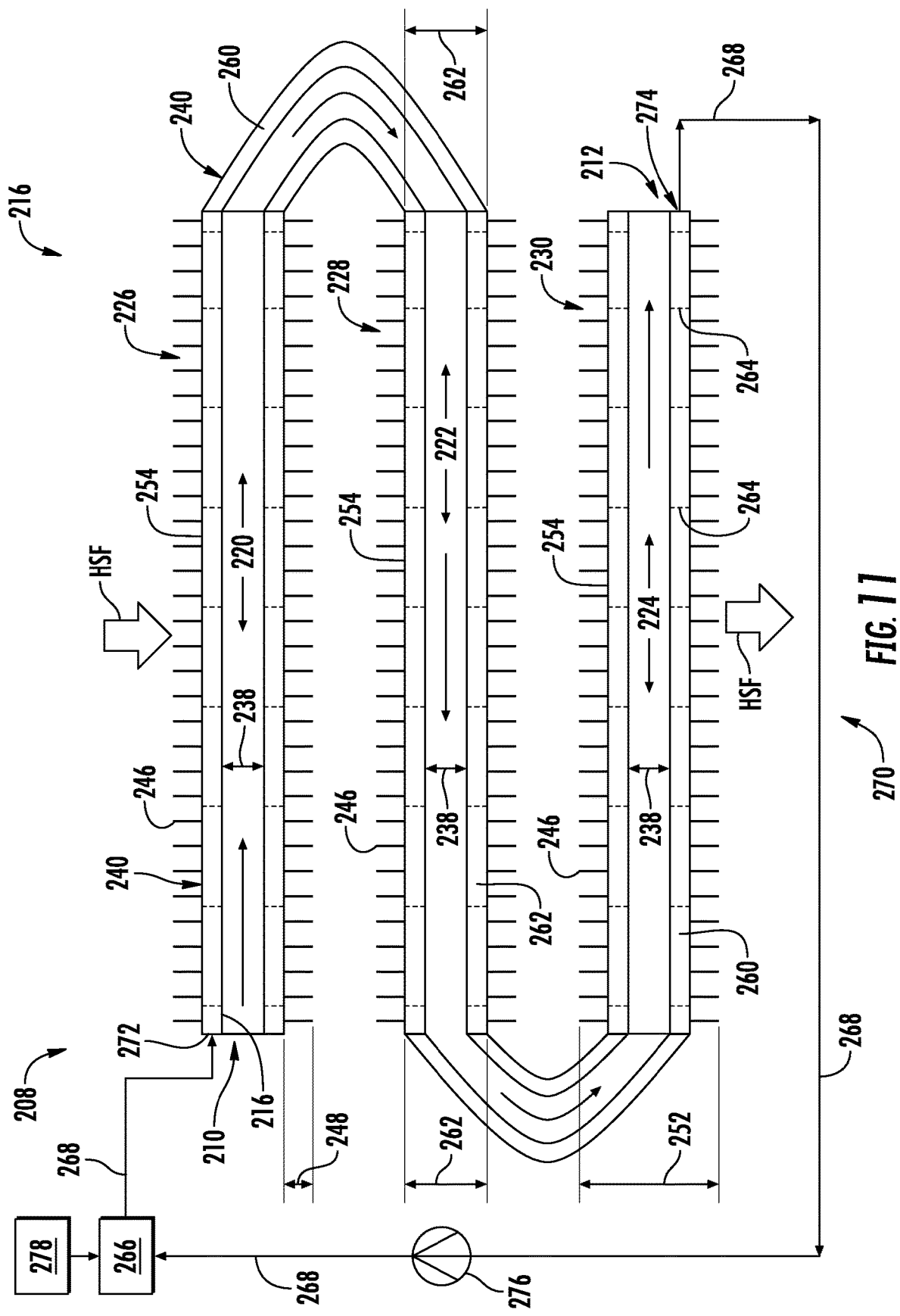
FIG. 11 is a cross-sectional schematic view of an exemplary inner-tube of an exemplary tube bank according to at least one embodiment of the present disclosure.

FIG. 11 provides a cross-sectional schematic view of an exemplary inner-tube 216 of the tube bank 208 according to at least one embodiment of the present disclosure. As shown in FIG. 11, the inner-tube 216 has a constant inner diameter 238 from the first portion 226 of the inner-tube 216 within the inlet region 220, through the second portion 228 of the inner-tube 216 within the mid region 222, and through the third portion 230 of the inner-tube 216 within the outlet region 224. The thermal buffer 240 comprises outer-tube 254 at least partially encasing inner-tube 216 and forming a flow channel 260 therebetween. The outer-tube 254 and the flow channel 260 extend along the inner-tube 216 from the tube inlet 210 at an upstream end of the inlet region 220, across the mid-region 222 and terminates at the tube outlet 212 at the outlet region 224.

In certain embodiments, the outer-tube 254 has a constant or substantially constant (allowing for tolerance variation) outer diameter 262 from the inlet region 220, across the mid region 222 and the outlet region 224. A plurality of fins 246 is disposed along each of the first portion 226 of the inner-tube 216 within the inlet region 220, the second portion 228 of the inner-tube 216 within the mid region 222, and the third portion 230 of the inner-tube 216 within the outlet region 224 and extending radially outwardly from the outer-tube 254. The fins 246 extend circumferentially around and are in thermal communication with the outer-tube 254. A constant fin height 248 and a constant fin outer diameter 252 is maintained across each of the inlet region 220, the mid-region 222 and the outlet region 224 of the respective inner-tube 216 of the tube bank 208. Multiple internal tube supports 264 connect the inner-tube 216 and outer-tube 254 to ensure structural integrity.

In an exemplary embodiment, as shown in FIG. 11, the flow channel 260 is fluidly coupled to a recirculating tertiary fluid source 266 for providing a tertiary fluid 268 to the flow channel 260. The recirculating tertiary fluid source 266 is part of a recirculating or closed system 270 that fluidly couples an inlet 272 of the flow channel 260 defined at the tube inlet 210, to an outlet 274 of the flow channel 260 defined/disposed at or proximate to the tube outlet 212. The tertiary fluid 268 may be recirculated or driven from the recirculating tertiary fluid source 266, through the flow channel 260 and back to the recirculating tertiary fluid source 266 via one or more external pump(s) 276 and/or other fluid driving devices. The constant outer diameter 262 of the outer-tube 254 minimizes pressure drop of the tertiary fluid 268. This configuration effectively creates a three-fluid heat exchanger with the recirculated tertiary fluid 268 acting as a third-side fluid.

A flowrate of the tertiary fluid 268 can be throttled via one or more fluid couplings or flow control devices (not shown) to account for changes in the H2 flowrate through the inner-tube 216 to maintain sufficient thermal gradient in the flow channel 260 across the inlet region 220, mid-region 222, and outlet region 224. Alternatively, another heat exchanger (not shown) can be added on a bypass circuit to manage changes in H2 flowrate through the inner-tube 216.

In an exemplary embodiment, as shown in FIG. 11, the recirculating tertiary fluid source 266 is in thermal communication with a heat-source 278 from the turbomachine 104. In an exemplary embodiment, the heat-source 278 may include one or more of the main lubrication system 152, compressor cooling air (CCA) system 154, thermal clearance control (ACC) system 156, and the generator lubrication system 158 as discussed above and shown in FIG. 3. In exemplary embodiments, the heat-source 278 includes the turbine section or jet exhaust section 120.

Examples of an exemplary tertiary fluid 268 may include but is not limited to, unless otherwise specified, any of the following: supercritical CO2, oil, Dowtherm™, and water. In an exemplary embodiment, the tertiary fluid 268 is a phase change material (PCM). An exemplary PCM may have one or more of the following attributes: a low melting point, a highly varied thermal conductivity based on temperature, a high volumetric storage capacity/latent heat of fusion, low density, and/or a high flash point. Examples of an exemplary PCM may include but is not limited to, unless otherwise specified, any of the following: glycerin, water, paraffin wax, and sodium acetate, sodium acetate trihydrate.

It will be appreciated from the description herein, that the present disclosure may further include one or more methods of operating an aircraft or more specifically, a gas turbine engine.

For example, in one exemplary aspect, a method of operating an aircraft with a gas turbine engine including a heat exchanger is provided. The method may be utilized with one or more of the components described above. The method includes flowing a hot-side-fluid from the heat source into a shell inlet of a heat exchanger across an inlet region, an intermediate region, and an outlet region of a tube bank disposed within the shell, wherein the tube bank includes an inner-tube and a thermal buffer least partially surrounding the inner-tube, wherein a first portion of the thermal buffer extends along a first portion of the inner-tube, a second portion of the thermal buffer extends along a second portion of the inner-tube, and a third portion of the thermal buffer extends along a third portion of the inner-tube; and the method further includes flowing H2 hydrogen fuel from a H2 hydrogen fuel tank through the first portion, second portion and third portion of the inner-tube, wherein thermal energy from the hot-side-fluid is transferred to the H2 hydrogen fuel.

Further aspects are provided by the subject matter of the following clauses:

A heat exchanger for a hydrogen fuel delivery system, the heat exchanger comprising: a tube bank including an inner-tube, wherein a first portion of the inner-tube extends through an inlet region of the tube bank, a second portion of the inner-tube extends through a mid-region of the tube bank, and a third portion of the inner-tube extends through an outlet region of the tube bank; a thermal buffer least partially surrounding the inner-tube, wherein a first portion of the thermal buffer extends along the first portion of the inner-tube, a second portion of the thermal buffer extends along the second portion of the inner-tube, and a third portion of the thermal buffer extends along the third portion of the inner-tube; and a plurality of fins disposed along the inner-tube and extending radially outwardly from an outer surface of the thermal buffer.

The heat exchanger of any preceding clause, wherein the inner tube is in fluid communication with a H2 hydrogen fuel source.

The heat exchanger as in any preceding clause, wherein the inner tube is in fluid communication with a H2 hydrogen fuel tank, and wherein the H2 Hydrogen fuel tank provides H2 hydrogen fuel to the inner tube in a liquid, gas, or supercritical state.

The heat exchanger of any preceding clause, wherein the first portion of the thermal buffer has a first thickness, the second portion of the thermal buffer has a second thickness, and the third portion of the thermal buffer has a third thickness, and wherein the first thickness is greater than the second thickness and the second thickness is greater than the third thickness.

The heat exchanger of any preceding clause, wherein each fin of the plurality of fins has a common outer diameter, the plurality of fins including a first portion of fins disposed along the first portion of the inner-tube, a second portion of fins disposed along the second portion of the inner-tube, and a third portion of fins disposed along the third portion of the inner-tube, wherein the fins of the first portion of fins have a first fin height, the fins of the second portion of fins have a second fin height, and the fins of the third portion of fins have a third fin height, and wherein each of the first, second, and third fin heights are equal or different.

The heat exchanger of any preceding clause, wherein the thermal buffer comprises a sealed-in-place phase change material.

The heat exchanger of any preceding clause, wherein the thermal buffer has a constant thickness across the first portion, second portion and the third portion of the inner-tube.

The heat exchanger of any preceding clause, wherein the first portion of the thermal buffer comprises a first thermal buffer material, the second portion of the thermal buffer comprises a second thermal buffer material, and the third portion of the thermal buffer comprises a third thermal buffer material, wherein each of the first, second and third thermal buffer materials have different thermal conductivity ratings.

The heat exchanger of any preceding clause, wherein the first thermal buffer material has a thermal conductivity rating that is lower than the second thermal buffer material and the second thermal buffer material has a thermal conductivity rating that is lower than the third thermal buffer material.

The heat exchanger of any preceding clause, wherein each fin of the plurality of fins has a common outer diameter and a common fin height.

The heat exchanger of any preceding clause, wherein the thermal buffer comprises an outer-tube at least partially encasing the inner-tube and extending continuously along the first portion of the inner-tube, the second portion of the inner-tube and the third portion of the inner-tube, wherein the outer-tube forms a flow channel around the inner-tube.

The heat exchanger of any preceding clause, wherein the outer-tube has a constant outer diameter from the inlet region, across the mid-region, and the outlet region of the tube bank.

The heat exchanger of any preceding clause, wherein each fin of the plurality of fins has a common outer diameter and a common fin height across each of the inlet region, the mid-region, and the outlet region of the tube bank.

The heat exchanger of any preceding clause, wherein the flow channel includes an inlet and an outlet, wherein the inlet and the outlet are fluidly coupled to a recirculating tertiary fluid source for providing a tertiary fluid to the flow channel.

The heat exchanger as in any preceding clause, wherein an inner wall of the shell includes grooves.

The heat exchanger as in any preceding clause, further comprising a plurality of external tube supports interconnecting the tube rows and connecting the tube bank with an inner wall of the shell.

The heat exchanger as in any preceding clause, further comprising internal tube supports connecting the inner-tube and to an outer-tube.

An aircraft, comprising a H2 hydrogen fuel tank and a heat exchanger, wherein the heat exchanger is in thermal communication with a heat source, the H2 hydrogen fuel tank, and a combustion section of a gas turbine engine, the heat exchanger comprising a tube bank including an inner-tube fluidly coupled to the H2 hydrogen fuel tank and to the combustion section, wherein a first portion of the inner-tube extends through an inlet region of the tube bank, a second portion of the inner-tube extends through a mid-region of the tube bank, and a third portion of the inner-tube extends through an outlet region of the tube bank, a thermal buffer least partially surrounding the inner-tube, wherein a first portion of the thermal buffer extends along the first portion of the inner-tube, a second portion of the thermal buffer extends along the second portion of the inner-tube, and a third portion of the thermal buffer extends along the third portion of the inner-tube; and a plurality of fins disposed along the inner-tube and extending radially outwardly from an outer surface of the thermal buffer.

The aircraft as in the preceding clause, wherein the H2 hydrogen fuel tank provides H2 hydrogen fuel to the heat exchanger in a liquid, gas, or supercritical state.

The aircraft as in any preceding clause, wherein the heat source includes one or more of a low-pressure compressor, a high-pressure compressor, a high-pressure turbine, a low-pressure turbine, or a jet exhaust section of the gas turbine engine.

The aircraft as in any preceding clause, wherein the first portion of the thermal buffer has a first thickness, the second portion of the thermal buffer has a second thickness, and the third portion of the thermal buffer has a third thickness, wherein the first thickness is greater than the second thickness, and the second thickness is greater than the third thickness or wherein the thermal buffer has a constant thickness across the first portion, second portion, and the third portion of the inner-tube.

The aircraft as in any preceding clause, wherein each fin of the plurality of fins has a common outer diameter, the plurality of fins including a first portion of fins disposed along the first portion of the inner-tube, a second portion of fins disposed along the second portion of the inner-tube, and a third portion of fins disposed along the third portion of the inner-tube, wherein the fins of the first portion of fins have a first fin height, the fins of the second portion of fins have a second fin height, and the fins of the third portion of fins have a third fin height, and wherein each of the first, second and third fin heights are equal or different.

The aircraft as in any preceding clause, wherein the thermal buffer comprises a sealed-in-place phase change material.

The aircraft as in any preceding clause, wherein the first portion of the thermal buffer comprises a first thermal buffer material, the second portion of the thermal buffer comprises a second thermal buffer material, and the third portion of the thermal buffer comprises a third thermal buffer material, wherein each of the first, second and third thermal buffer materials have different thermal conductivity ratings.

The aircraft as in any preceding clause, wherein the thermal buffer comprises an outer-tube at least partially encasing the inner-tube and extending along the first portion of the inner-tube, the second portion of the inner-tube and the third portion of the inner-tube, wherein the outer-tube forms a flow channel around the inner-tube.

The aircraft as in any preceding clause, wherein the outer-tube has a constant outer diameter from the inlet region, across the mid-region, and the outlet region of the tube bank, and wherein the flow channel includes an inlet and an outlet, wherein the inlet and the outlet are fluidly coupled to a recirculating tertiary fluid source for providing a tertiary fluid to the flow channel, and wherein each fin of the plurality of fins has a common outer diameter and a common fin height across each of the inlet region, the mid-region, and the outlet region of the tube bank.

The aircraft as in any preceding clause, wherein each fin of the plurality of fins has a common outer diameter and a common fin height across each of the inlet region, the mid-region, and the outlet region of the tube bank.

The aircraft as in any preceding clause, wherein an inner wall of the shell includes grooves.

The aircraft as in any preceding clause, wherein the heat exchanger further comprises a plurality of external tube supports interconnecting the tube rows and connecting the tube bank with an inner wall of the shell.

The aircraft as in any preceding clause, wherein the heat exchanger further comprises internal tube supports connecting the inner-tube and to an outer-tube.

A method for operating an aircraft, comprising flowing a hot-side-fluid from a heat source into a shell inlet of a heat exchanger across an inlet region, an intermediate region, and an outlet region of a tube bank disposed within the shell, wherein the tube bank includes an inner-tube and a thermal buffer least partially surrounding the inner-tube, wherein a first portion of the thermal buffer extends along a first portion of the inner-tube, a second portion of the thermal buffer extends along a second portion of the inner-tube, and a third portion of the thermal buffer extends along a third portion of the inner-tube; and flowing H2 hydrogen fuel from a H2 hydrogen fuel tank through the first portion, second portion and third portion of the inner-tube, wherein thermal energy from the hot-side-fluid is transferred to the H2 hydrogen fuel.

The method for operating an aircraft as in any preceding clause, wherein the H2 hydrogen fuel is in one of a liquid, gas, or supercritical state.

The method for operating an aircraft as in any preceding clause, wherein the aircraft includes a gas turbine engine including a combustion section, wherein the heat exchanger is in thermal communication with the heat source, the H2 hydrogen fuel tank, and the combustion section, and the inner-tube is fluidly coupled to the H2 hydrogen fuel tank and to the combustion section.

The method for operating an aircraft as in any preceding clause, wherein a plurality of fins is disposed along the inner-tube and extends radially outwardly from an outer surface of the thermal buffer.

The method of operating an aircraft as in the preceding clause, further comprising flowing the H2 hydrogen fuel from an outlet of the tube bank to the combustion section.

The method for operating an aircraft as in any preceding clause, wherein the H2 hydrogen fuel tank provides H2 hydrogen fuel to the heat exchanger in a liquid, gas, or supercritical state.

The method for operating an aircraft as in any preceding clause, wherein the heat source includes one or more of a low-pressure compressor, a high-pressure compressor, a high-pressure turbine, a low-pressure turbine, or a jet exhaust section of the gas turbine engine.

The method for operating an aircraft as in any preceding clause, wherein the first portion of the thermal buffer has a first thickness, the second portion of the thermal buffer has a second thickness, and the third portion of the thermal buffer has a third thickness, wherein the first thickness is greater than the second thickness, and the second thickness is greater than the third thickness or wherein the thermal buffer has a constant thickness across the first portion, second portion, and the third portion of the inner-tube.

The method for operating an aircraft as in any preceding clause, wherein each fin of the plurality of fins has a common outer diameter, the plurality of fins including a first portion of fins disposed along the first portion of the inner-tube, a second portion of fins disposed along the second portion of the inner-tube, and a third portion of fins disposed along the third portion of the inner-tube, wherein the fins of the first portion of fins have a first fin height, the fins of the second portion of fins have a second fin height, and the fins of the third portion of fins have a third fin height, and wherein each of the first, second and third fin heights are equal or different.

The method for operating an aircraft as in any preceding clause, wherein the thermal buffer comprises a sealed-in-place phase change material.

The method for operating an aircraft as in any preceding clause, wherein the first portion of the thermal buffer comprises a first thermal buffer material, the second portion of the thermal buffer comprises a second thermal buffer material, and the third portion of the thermal buffer comprises a third thermal buffer material, wherein each of the first, second and third thermal buffer materials have different thermal conductivity ratings.

The method for operating an aircraft as in any preceding clause, wherein the thermal buffer comprises an outer-tube at least partially encasing the inner-tube and extending along the first portion of the inner-tube, the second portion of the inner-tube and the third portion of the inner-tube, wherein the outer-tube forms a flow channel around the inner-tube.

The method for operating an aircraft as in any preceding clause, wherein the outer-tube has a constant outer diameter from the inlet region, across the mid-region, and the outlet region of the tube bank, and wherein the flow channel includes an inlet and an outlet, wherein the inlet and the outlet are fluidly coupled to a recirculating tertiary fluid source for providing a tertiary fluid to the flow channel.

The method for operating an aircraft as in any preceding clause, wherein each fin of the plurality of fins has a common outer diameter and a common fin height across each of the inlet region, the mid-region, and the outlet region of the tube bank.

This written description uses examples to disclose the present disclosure, including the best mode, and to also enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A heat exchanger for a hydrogen fuel delivery system, the heat exchanger comprising:
    a tube bank including an inner-tube, wherein a first portion of the inner-tube extends through an inlet region of the tube bank, a second portion of the inner-tube extends through a mid-region of the tube bank, and a third portion of the inner-tube extends through an outlet region of the tube bank;
    a thermal buffer least partially surrounding the inner-tube, wherein a first portion of the thermal buffer extends along the first portion of the inner-tube, a second portion of the thermal buffer extends along the second portion of the inner-tube, and a third portion of the thermal buffer extends along the third portion of the inner-tube, wherein the first portion of the thermal buffer has a first thickness, the second portion of the thermal buffer has a second thickness, and the third portion of the thermal buffer has a third thickness, and wherein the first thickness is greater than the second thickness and the second thickness is greater than the third thickness; and
    a plurality of fins disposed along the inner-tube and extending radially outwardly from an outer surface of the thermal buffer.

2. The heat exchanger as in claim 1, wherein the inner tube is in fluid communication with a H2 hydrogen fuel source.

3. The heat exchanger as in claim 1, wherein each fin of the plurality of fins has a common outer diameter, the plurality of fins including a first portion of fins disposed along the first portion of the inner-tube, a second portion of fins disposed along the second portion of the inner-tube, and a third portion of fins disposed along the third portion of the inner-tube, wherein the fins of the first portion of fins have a first fin height, the fins of the second portion of fins have a second fin height, and the fins of the third portion of fins have a third fin height, and wherein each of the first, second, and third fin heights are equal or different.

4. The heat exchanger as in claim 1, wherein the thermal buffer comprises a sealed-in-place phase change material.

5. The heat exchanger as in claim 1, wherein the first portion of the thermal buffer has a constant thickness across the first portion of the inner tube, the second portion of the thermal buffer has a constant thickness across the second portion of the inner tube, and the third portion of the thermal buffer has a constant thickness across the third portion of the inner-tube.

6. The heat exchanger as in claim 1, wherein the first portion of the thermal buffer comprises a first thermal buffer material, the second portion of the thermal buffer comprises a second thermal buffer material, and the third portion of the thermal buffer comprises a third thermal buffer material, wherein each of the first, second and third thermal buffer materials have different thermal conductivity ratings.

7. The heat exchanger as in claim 6, wherein the first thermal buffer material has a thermal conductivity rating that is lower than the second thermal buffer material and the second thermal buffer material has a thermal conductivity rating that is lower than the third thermal buffer material.

8. The heat exchanger as in claim 6, wherein each fin of the plurality of fins has a common outer diameter and a common fin height.

9. The heat exchanger as in claim 1, wherein the thermal buffer comprises an outer-tube at least partially encasing the inner-tube and extending continuously along the first portion of the inner-tube, the second portion of the inner-tube and the third portion of the inner-tube.

10. An aircraft, comprising:
    a H2 hydrogen fuel tank, and a heat exchanger, wherein the heat exchanger is in thermal communication with a heat source, the H2 hydrogen fuel tank, and a combustion section of a gas turbine engine, the heat exchanger comprising:
        a tube bank including an inner-tube fluidly coupled to the H2 hydrogen fuel tank and to the combustion section, wherein a first portion of the inner-tube extends through an inlet region of the tube bank, a second portion of the inner-tube extends through a mid-region of the tube bank, and a third portion of the inner-tube extends through an outlet region of the tube bank;
        a thermal buffer least partially surrounding the inner-tube, wherein a first portion of the thermal buffer extends along the first portion of the inner-tube, a second portion of the thermal buffer extends along the second portion of the inner-tube, and a third portion of the thermal buffer extends along the third portion of the inner-tube, wherein the first portion of the thermal buffer comprises a first thermal buffer material, the second portion of the thermal buffer comprises a second thermal buffer material, and the third portion of the thermal buffer comprises a third thermal buffer material, wherein each of the first, second and third thermal buffer materials have different thermal conductivity ratings; and a plurality of fins disposed along the inner-tube and extending radially outwardly from an outer surface of the thermal buffer.

11. The aircraft as in claim 10, wherein the first portion of the thermal buffer has a first thickness, the second portion of the thermal buffer has a second thickness, and the third portion of the thermal buffer has a third thickness, wherein the first, second, and third thicknesses are different.

12. The aircraft as in claim 11, wherein the thermal buffer comprises a sealed-in-place phase change material.

13. The aircraft as in claim 11, wherein the first thickness is greater than the second thickness, and the second thickness is greater than the third thickness.

14. The aircraft as in claim 10, wherein the thermal buffer comprises an outer-tube at least partially encasing the inner-tube and extending along the first portion of the inner-tube, the second portion of the inner-tube and the third portion of the inner-tube.

15. The aircraft as in claim 14, wherein the outer-tube has a constant outer diameter from the inlet region, across the mid-region, and the outlet region of the tube bank, wherein each fin of the plurality of fins has a common outer diameter and a common fin height across each of the inlet region, the mid-region, and the outlet region of the tube bank.

16. The aircraft as in claim 10, wherein each fin of the plurality of fins has a common outer diameter, the plurality of fins including a first portion of fins disposed along the first portion of the inner-tube, a second portion of fins disposed along the second portion of the inner-tube, and a third portion of fins disposed along the third portion of the inner-tube, wherein the fins of the first portion of fins have a first fin height, the fins of the second portion of fins have a second fin height, and the fins of the third portion of fins have a third fin height, and wherein each of the first, second and third fin heights are equal or different.

17. A method for operating an aircraft, comprising:
flowing a hot-side-fluid from a heat source into a shell inlet of a heat exchanger across an inlet region, an intermediate region, and an outlet region of a tube bank disposed within the shell, wherein the tube bank includes an inner-tube and a thermal buffer least partially surrounding the inner-tube, wherein a first portion of the thermal buffer extends along a first portion of the inner-tube, a second portion of the thermal buffer extends along a second portion of the inner-tube, and a third portion of the thermal buffer extends along a third portion of the inner-tube, and wherein the first portion of the thermal buffer comprises a first thermal buffer material, the second portion of the thermal buffer comprises a second thermal buffer material, and the third portion of the thermal buffer comprises a third thermal buffer material, wherein each of the first, second and third thermal buffer materials have different thermal conductivity ratings; and
flowing H2 hydrogen fuel from a H2 hydrogen fuel tank through the first portion, second portion and third portion of the inner-tube, wherein thermal energy from the hot-side-fluid is transferred to the H2 hydrogen fuel.

* * * * *